United States Patent
Brunne et al.

(10) Patent No.: US 11,395,394 B2
(45) Date of Patent: Jul. 19, 2022

(54) ILLUMINATION DEVICE FOR VEHICLES

(71) Applicant: HELLA GmbH & Co. KGaA, Lippstadt (DE)

(72) Inventors: David Brunne, Lippstadt (DE); Florian Herold, Bielefeld (DE); Ingo Moellers, Rietberg (DE); Martin Pluempe, Bad Wuennenberg (DE); Jacek Roslak, Paderborn (DE); Alexander Schwan, Kamen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/334,217

(22) Filed: May 28, 2021

(65) Prior Publication Data
US 2021/0289605 A1  Sep. 16, 2021

Related U.S. Application Data

(63) Continuation of application No. PCT/EP2019/082386, filed on Nov. 25, 2019.

(30) Foreign Application Priority Data

Nov. 30, 2018 (DE) ...................... 10 2018 130 512.5

(51) Int. Cl.
*F21S 41/25* (2018.01)
*H05B 47/155* (2020.01)
(Continued)

(52) U.S. Cl.
CPC ............ *H05B 47/155* (2020.01); *F21S 41/25* (2018.01); *F21V 14/06* (2013.01); *F21V 29/503* (2015.01)

(58) Field of Classification Search
None
See application file for complete search history.

(56) References Cited

U.S. PATENT DOCUMENTS

| 10,591,129 B2 | 3/2020 | Albou | |
|---|---|---|---|
| 2005/0074221 A1* | 4/2005 | Remillard | ................ H04N 5/33 385/147 |

(Continued)

FOREIGN PATENT DOCUMENTS

| DE | 102005041234 A1 | 3/2007 |
|---|---|---|
| DE | 102011083025 A1 | 3/2013 |

(Continued)

OTHER PUBLICATIONS

International Search Report dated Feb. 19, 2020 in corresponding application PCT/EP2019/082386.

*Primary Examiner* — Elmito Breval
(74) *Attorney, Agent, or Firm* — Muncy, Geissler, Olds & Lowe, P.C.

(57) ABSTRACT

An illumination device having a first and second light module each having a light source and an optical unit for generating a first illumination region and a second illumination region, respectively. A control unit controls the first light module and the second light module, so that a larger number of light pixels are imaged in the first illumination region than in the second illumination region with respect to a surface of equal size, wherein the light pixels of the first light module have a greater illumination intensity than the light pixels of the second light module. The control unit acts upon the light sources of the first light module or the second light module such that the light sources of the first and second light module are each operated with a thermal output within a tolerance band and below a maximum thermal output of the at least one light source.

18 Claims, 4 Drawing Sheets

(51) Int. Cl.
*F21V 29/503* (2015.01)
*F21V 14/06* (2006.01)

(56) References Cited

U.S. PATENT DOCUMENTS

| | | | |
|---|---|---|---|
| 2008/0239746 A1 | 10/2008 | Wuller et al. | |
| 2011/0235349 A1* | 9/2011 | Nakaya | F21S 41/151 |
| | | | 362/466 |
| 2015/0219298 A1* | 8/2015 | Mollers | F21S 41/19 |
| | | | 362/520 |
| 2015/0377442 A1* | 12/2015 | Bhakta | F21S 41/25 |
| | | | 362/510 |
| 2018/0010755 A1* | 1/2018 | Park | F21S 41/147 |
| 2018/0056850 A1 | 3/2018 | Schwaiger | |
| 2018/0073700 A1* | 3/2018 | Orisich | F21S 41/635 |
| 2018/0347781 A1* | 12/2018 | Potter | F21S 41/14 |
| 2019/0359121 A1* | 11/2019 | Shimada | B60Q 1/1415 |

FOREIGN PATENT DOCUMENTS

| | | |
|---|---|---|
| DE | 102013114264 A1 | 7/2015 |
| DE | 102016216364 A1 | 3/2018 |
| DE | 102018000080 A1 | 6/2018 |
| DE | 102017206194 A1 | 10/2018 |
| DE | 102017206274 A1 | 10/2018 |
| EP | 3342638 A1 | 7/2018 |

\* cited by examiner

ILLUMINATION DEVICE FOR VEHICLES

This nonprovisional application is a continuation of International Application No. PCT/EP2019/082386, which was filed on Nov. 25, 2019 and which claims priority to German Patent Application No. 10 2018 130 512.5, which was filed in Germany on Nov. 30, 2018 and which are both herein incorporated by reference.

BACKGROUND OF THE INVENTION

Field of the Invention

The present invention relates to an illumination device for vehicles, comprising a first light module having a light source and an optical unit for generating a first illumination region, comprising a second light module having a light source and an optical unit for generating a second illumination region, comprising a control unit for controlling the first light module and the second light module, so that a larger number of light pixels are imaged in the first illumination region than in the second illumination region with respect to a surface of equal size.

Description of the Background Art

An illumination device for vehicles is known from DE 10 2005 041 234 A1, which corresponds to US 2008/0239746, which is incorporated herein by reference, and which comprises a first light module and a second light module. Both light modules have a similar light source, each of which is designed as a matrix of LED light sources. The optical units of the two light modules are designed differently so that light pixels of different sizes can be generated in a light distribution. The smaller light pixels can be used to better reproduce, for example, the asymmetrical rise of a light/dark boundary. Because the one light module has a higher resolution, i.e., the neighboring light pixels are imaged at a smaller beam angle, a plurality of light distributions can be designed to be more homogeneous. The control of the individual lighting elements of the light source, therefore, the activation of the lighting elements at full load or at partial load when dimming, depends on the local light intensity requirement within the light distribution.

An illumination device for vehicles with a first light module and a second light module is known from DE 10 2016 216 364 A1, which corresponds to US 2018/0056850, with each module comprising a light source and an optical unit. The illumination device further has a control unit, so that the second light module emits light substantially into a second illumination region in an area in front of a vehicle, the second region being substantially contained within a first illumination region illuminated by the first light module. The second light module emits light of a lower resolution and higher light luminance than the first light module. The second light module can be used to increase a range. Thus, when the first light module and the second light module are activated, a high beam distribution can be generated in particular. To generate the relatively broad second illumination region, the second light module has a matrix-like arrangement of a plurality of light source elements, preferably LED light elements, as the light source. The optical unit of the first light module can be formed, for example, by a micromirror array (DMD). The light source of the second light module is designed as a single, high-intensity light source, for example, as an LED light source or laser light source. The superposition of light modules of a different resolution and light intensity enables the provision of a variety of different light distributions. However, it is desirable to optimize the illumination device in such a way that the cooling effort is as low as possible.

SUMMARY OF THE INVENTION

It is therefore an object of the present invention to develop further an illumination device for vehicles in such a way that a plurality of light modules with a different resolution and different light intensity are controlled coordinated with one another, so that a large number of different light distributions can be generated with a minimal cooling effort.

To achieve said object, the invention 1 is characterized in that the light pixels of the first light module have a greater illumination intensity than the light pixels of the second light module, and in that the control unit acts upon the light sources of the first light module or the second light module in such a way that when the light sources are activated, said light sources of the first and second light modules are each operated with a thermal output within a tolerance band and below a maximum thermal output of the at least one light source, whose upper output value corresponds 70%, preferably 65%, in particular 55%, to the maximum light output of the first light module or second light module.

The advantage of the invention is that a plurality of different and in each case homogeneous light distributions can be generated with a reduced cooling requirement. The basic idea of the invention is to control the light modules so that a predefined number of different light distributions are generated with an optimal, preferably uniform distribution of the light output between the light modules. Two requirements are fulfilled hereby. On the one hand, the light modules are controlled so that the superimposed light pixels of the light modules in the light distribution fulfill the lighting specifications. On the other hand, the light modules are controlled such that the light output is uniformly distributed between the light modules.

A tolerance band for the light output with which the light sources of the respective light modules are operated can lie in a range of 50% of the maximum light output of the light source with the highest light intensity. The cooling requirement for the respective light sources can thus be reduced, because all light source elements of the respective light source are operated within the arithmetic mean with an electrical power within the tolerance band. This does not preclude individual light source elements from being operated at maximum output. A compensation is created in that other light source elements are in the switched-off state or are only slightly dimmed with a relatively low light output. The basic inventive idea here is not to operate all light source elements of a light source at full output but only a part of them, so that the light source can be operated overall with an electrical power significantly below the maximum output or the nominal output. This can reduce the cooling requirement. A compensation for the loss of light output takes place by a corresponding control of another light source.

The tolerance band can be in the range from 35% to 65%, in particular from 45% to 55%, preferably from 48% to 52% of the maximum light output of the light source. The maximum light output of the light source is determined by the sum of the maximum light output or nominal output of the individual light source elements of the same. The equalization of the electrical power can advantageously result in an equalization of the thermal output or heat emission of the light sources, which reduces the cooling effort.

The light sources of the light modules can have the same maximum light output or preferably have the same number of light source elements. The control of the light sources can be simplified in this way, wherein the same cooling module can be associated with each of the light sources.

A first illumination region of the high-resolution first light module can comprise an area on a measuring screen that corresponds to a range of ⅕ to ⅖ of an area of the second illumination region of the second light module. In this way, a sufficiently high resolution can advantageously be achieved, which can be used, for example, for imaging logo light functions.

The plurality of light source elements of a light source can be arranged in a matrix, the horizontal width of which is three to five times greater than a vertical height of the same. As a result, the optical unit associated with the light sources can advantageously be simply constructed, for example, by means of a lens arrangement, in order to generate the required light distribution in the form of a low beam or high beam.

The light source can have at least 10,000 light source elements, so that the light distribution can be generated with a relatively high resolution.

It is understood that there can also be fewer or more light source elements, e.g., 50, 100, 20,000, or more than 100,000.

The light source control unit can have an imaging error compensation control by means of which such light source elements of the second light module are switched on the light of which is imaged by the optical unit onto an edge region of the first illumination region. In this way, imaging errors of the first light module that arise in the edge region of the first illumination region can advantageously be compensated.

The light source control unit can have a fine resolution control by means of which only corresponding light source elements of the first light module are activated for the projection of a finely resolved structure, in particular a logo, in the area in front of the vehicle. The exclusive control of the light source elements of the first light module relates to the local arrangement of the logo in the area in front of the vehicle. As a result, the logo can advantageously be displayed at a particularly high resolution.

The optical unit of the first and/or second light module can be formed of a lens arrangement that images the individual light source elements in the area in front of the vehicle. As a result, the control of the light modules can be reduced solely to the control of the light sources. If an optical unit with controllable optical elements, such as, e.g., a liquid crystal unit (LCD) or a micromirror array (DMD), is provided, additional control of the optical elements of the optical unit can also be provided.

The light source control unit can have a short-term control via which in a predefined time window that is dependent on the maximum light output of the light source, the light source elements of the first light module can be operated at the maximum light output and the light source elements of the second light module can be operated at a differential output to form the required light output for the respective light pixels of the light distribution. Such a control is provided for the generation of such a light distribution in which the lighting requirements cannot be met by controlling the light sources within the tolerance range. It is understood that only light distributions are considered that do not lead to an overload of the cooling system, thus, for example, the generation of a time-limited welcome light.

The light source elements of the light sources or the light sources of the light modules can be arranged on the same support. As a result, the illumination device advantageously has a relatively simple structure.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

An illumination device of the invention is used to generate multiple different light distributions, for example, low beam, high beam, city, or highway light, wherein signaling functions such as, for example, a marking light or logo projection light are generated in addition.

Figure 1:
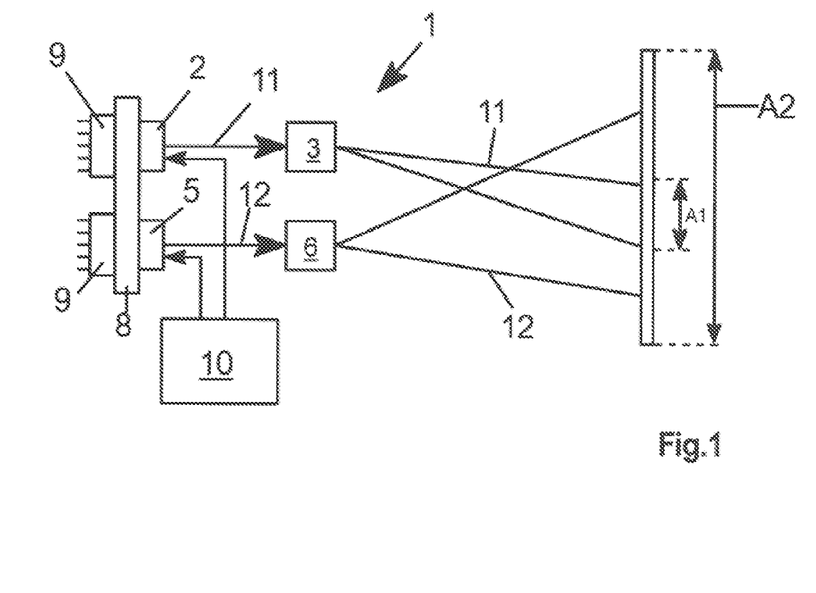
FIG. 1 shows a schematic representation of an illumination device according to a first embodiment with a first light module and with a second light module.

The illumination device is installed in a housing of a headlight which is arranged in a front area of the vehicle. According to a shown embodiment of the illumination device, it has a first light module 1 with a light source 2 and an optical unit 3 by means of which a first illumination region A1 is illuminated on a measuring screen or in an area in front of the vehicle. Further, the illumination device comprises a second light module 4 containing a light source 5 and an optical unit 6 by means of which a second illumination region A2 is generated on the measuring screen or in the area in front of the vehicle.

Figure 2:
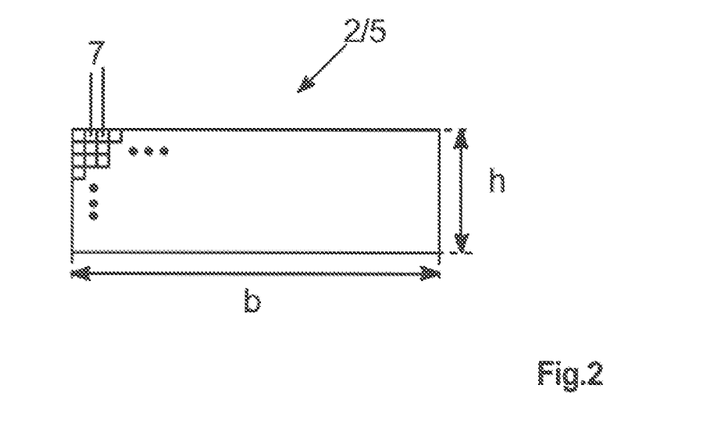
FIG. 2 shows a schematic representation of a light source formed of a plurality of light source elements.

Light source 2 of first light module 1 and light source 5 of second light module 4 are of identical design and each have a plurality of light source elements 7 which are arranged in a matrix-like manner in rows and columns. The light source is designed as a pixelated light source. In the present exemplary embodiment, each light source 2, 5 contains 10,000 light source elements, which are each formed as LED light source elements. It is understood that there can also be fewer or more light source elements, e.g., 50, 100, 20,000, or more than 100,000. Light source elements 7 of light source 2 and of the other light source 5 are combined in separate LED chips. The LED chip or light source 2, 5 each have a rectangular dimension, wherein they have a vertical height h which is smaller than a horizontal width b. In the present exemplary embodiment, the quotient of the horizontal width b and the vertical height h is in a range between 3 and 5, preferably 4. The dimension of light sources 2, 5 thus specifies the shape of the light distribution to be generated or the illumination regions A1, A2, the horizontal width of which is greater than the vertical height.

Light sources 2, 5 are arranged on a common support 8 to the rear side of which a cooling module 9 associated with each of light sources 2, 5 is connected.

The illumination device further comprises an electrical control unit 10, by means of which light sources 2, 5 of first light module 1 or second light module 4 and in particular individual light source elements 7 of light sources 2, 5 can be controlled. Depending on the interpretation of the control signal emitted by control unit 10, light source elements 7 can be operated in the switched-on state at a maximum output (nominal output) or at a reduced output (dimmed state) or in a switched-off state at a minimum output (zero output).

Figure 3:
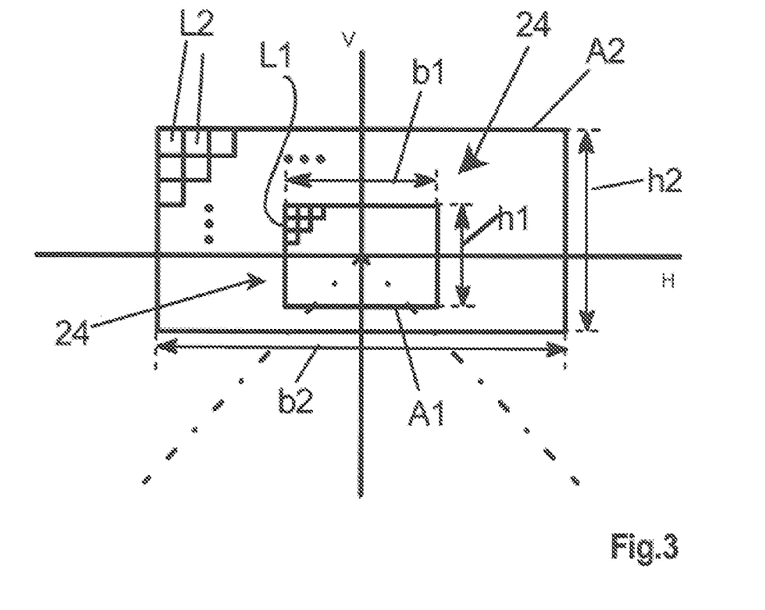
FIG. 3 shows a schematic representation of illumination regions of a first light module and a second light module on a measuring screen.

In the present exemplary embodiment, light sources 2, 5 are of the same design. Optical unit 3 of first light module 1 and optical unit 6 of second light module 4 are designed differently, so that light 11 of first light module 1 is imaged in the first illumination region A1, which is arranged within the illumination region A2 generated by light 12 of second light module 4. First illumination region A1 is formed by light pixels L1, which have a smaller area than light pixels L2 of second illumination region A2. In FIG. 3, illumination regions A1, A2 are shown on a measuring screen 25 meters away from the illumination device. The number of light pixels L1 per area of first light module 1 is thus greater than the number of light pixels L2 of second light module 4. First light module 1 thus generates a higher-resolution light distribution than second light module 4. In addition, with the same control, light pixels L1 have a greater illumination intensity compared to light pixels L2, so that illumination region A1 generated by first light module 1 can have a greater light intensity or illumination intensity relative to second illumination region A2. First illumination region A1 can, for example, have a horizontal width b1 of +/−14° and a vertical height of −7° to +2°. Second illumination region A2 can, for example, have a horizontal width b2 in the range of −22° to +22° and a vertical height of −5° to +5°. First light module 1 can have a resolution of 0.0687° per pixel, whereas second light module 4 can have a resolution of 0.1375° per pixel. The maximum illumination intensity of first light module 1 can be in the range from 160 lx to 170 lx and the maximum illumination intensity of second light module 4 can be in the range from 40 lx to 50 lx, so that the illumination intensity ratio between first illumination region A1 and second illumination region A2 is greater than three.

Figure 4:
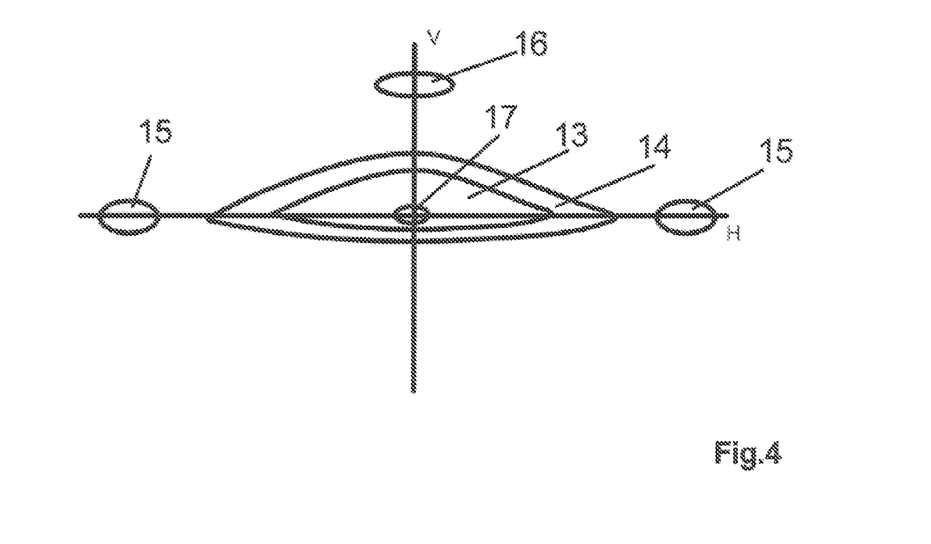
FIG. 4 shows a light distribution of the illumination device according to FIGS. 1 to 3 when the light modules are operated at the maximum light output (nominal output)

FIG. 4 shows a light distribution of the two light modules 1, 4 when light source elements 7 of light source 2 and further light source 5 are controlled at maximum output. First light module 1 substantially illuminates a central region 13 of the light distribution, whereas an annular region 14 surrounding central region 13 as well as lateral end regions 15 and an upper end region 16 are illuminated by means of second light module 4. Further, second light module 4 illuminates a core region 17, which lies within central region 13 and can thus serve to intensify the light in the area of the zero point. It is understood that light is also imaged between regions 14, 15, 16, 17 of second illumination region A2 and outside central region 13 of first illumination region A1. However, this light component is significantly smaller compared to the light components sketched in FIG. 4.

Figure 5:
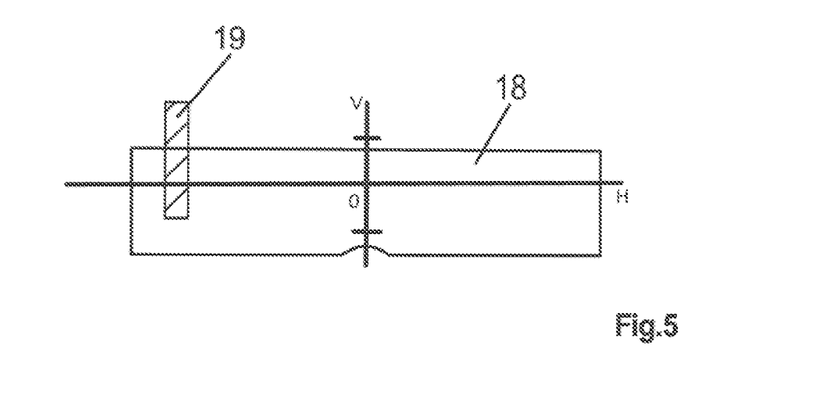
FIG. 5 shows a glare-free high beam distribution of the light distribution with a glare-control region in which other road users are located.

FIG. 5 shows the light distribution of a glare-free high beam with a glare-control region. In this case, light source elements 7 of light source 2 and light source 5 are controlled so that the specified light values are met and thus a high beam distribution 18 with a glare-control region 19 is generated. Another road user who should not be dazzled is located in glare-control region 19. The location of glare-control region 19 can change depending on the traffic situation. For this purpose, a sensor system is provided by means of which the position of the other road users can be detected. The light values for high beam distribution 18 are met although none of the light modules 1, 4 are operated at maximum light output. As can be seen from FIG. 7, light sources 2, 5 of first light module 1 or of second light module 4 are each operated within a tolerance band T which runs below the maximum light output $P_{max}$ of light sources 2, 5. The tolerance band T has an upper output value which corresponds to 70%, preferably 65%, in particular 55%, of the maximum light output $P_{max}$ of first light module 1 or second light module 4. The tolerance band T can run, for example, in the range from 35% to 65%, in particular from 45% to 55%, preferably from 48% to 52%, of the maximum light output of light sources 2, 5. Light sources 2, 5 are preferably each operated in the range of half the maximum output $P_{max}$ of the same, so that a well-balanced cooling of light sources 2, 5 can be effected.

Figure 7:
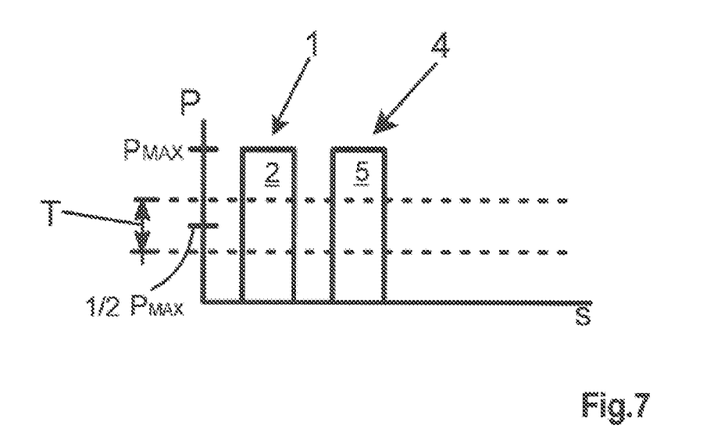
FIG. 7 shows an output diagram for the illumination device with two light sources of the same nominal output.

Because light sources 2, 5 each formed of a plurality of light source elements 7, it is sufficient for balanced cooling that light source elements 7 of respective light source 2, 5 are operated in the arithmetic mean within the tolerance band T. For example, one part of light source elements 7 of first light module 1 can be operated at maximum light output (nominal output) of light source elements 7, whereas another part of light source elements 7 of the same light source 2 is in the switched-off state. Light source elements 7 of light sources 2 and 5 are controlled such that, on the one hand, the required light values for the light distribution to be generated are met and, on the other hand, there is a uniform distribution of the light output between light sources 2, 5 of the two light modules 1, 4 within the tolerance band T. Light sources 2, 5 are therefore always operated at partial output in each case.

Figure 8:
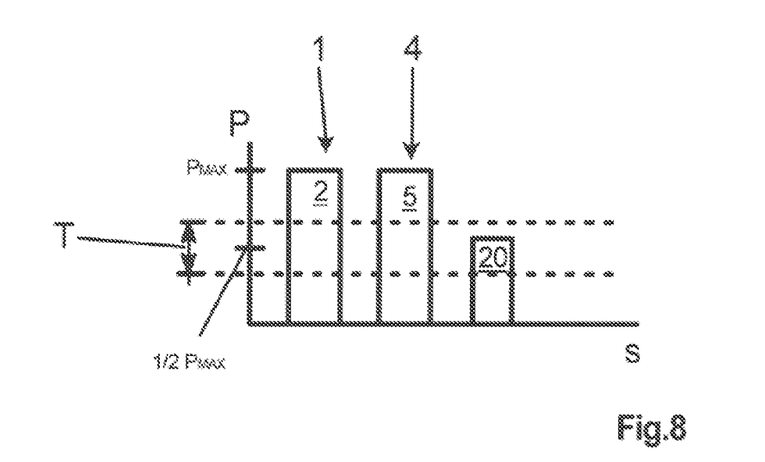
FIG. 8 shows an output diagram of the illumination device with three light sources of different maximum light output.

According to an alternative embodiment of the invention according to FIG. 8, three light modules can also be provided, wherein in comparison to the embodiment described above, a third light module is added with a light source 20, the maximum output of which is approximately 50% of the maximum output of the respective light sources 2, 5. This light source 20 is operated at full load when it is operated within the tolerance band T; i.e., light source elements 7 of light source 20 are either switched on or switched off without being operated in a dimmed state. The light module operated with third light source 20 can serve, for example, for spot-like illumination of a partial region of the light distribution. If third light source 20 is to be operated in a partial-load operation, the tolerance range T is selected to be correspondingly larger.

Figure 6:
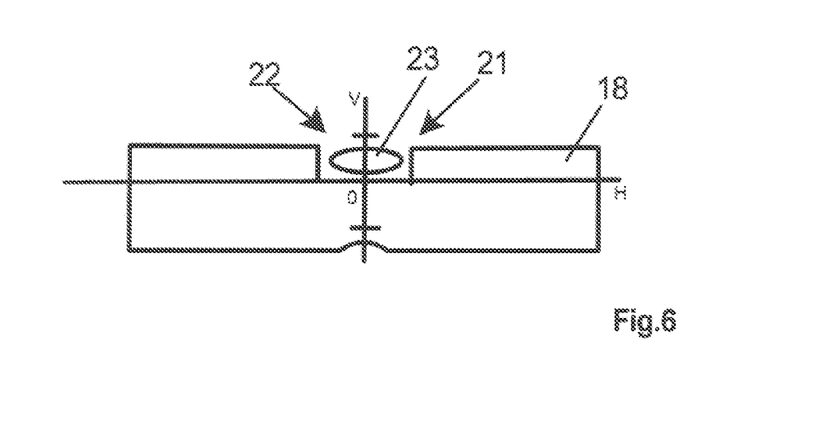
FIG. 6 shows a light distribution containing a logo representation.

According to a further embodiment of the invention according to FIG. 6, the illumination device formed of the two light modules 1 and 4 can be used to generate a fine resolution light distribution 21 (light distribution) which is superimposed on high beam distribution 18 according to FIG. 5. For this purpose, control unit 10 has a fine resolution control by means of which only light source elements 7 of light source 2 of first light module 1 are controlled or activated in the fine resolution region 22 of the light distribution in which there is a finely resolved structure (logo 23). Light source elements 7 of light source 5 of second light module 4 are controlled such that light 12 is not emitted into the fine resolution region (logo light region 22) but only into the adjacent region. The projection of logo 23 thus occurs exclusively by first light module 1, which enables a correspondingly high resolution.

According to a further embodiment of the invention, control unit 10 can have an imaging error compensation control by means of which part of light source elements 7 of second light module 4 are controlled such that their emitted light is imaged by means of optical unit 6 in an edge region 24 of first illumination region A1 in order to compensate imaging errors in first light module 1.

Optical units 3, 6 are preferably each designed as a lens arrangement with a number of lenses by means of which light 11, 12 emitted by the respective light sources 2, 5 is imaged to form the desired light distributions according to the specifications.

According to a further embodiment of the invention, control unit 10 can have a short-term control by means of which part or all of the light source elements 7 of first light module 1 are operated at a maximum light output in a predefined time window that is dependent on the maximum cooling capacity of cooling modules 9. In the event that this maximum light output is insufficient, light source elements 7 of second light module 4 are controlled such that they compensate for the difference to the required light output in the space, delimited by light pixels L1, of first illumination region A1. Second light module 4 thus makes available the still required illumination intensity in the regions of first illumination region A1, which cannot be provided by first light module 1 alone. For example, a welcome light or another signal function that is only provided for a limited period of time can be realized in this way. The time window is so short that overloading cooling modules 9 is avoided.

According to a further embodiment of the invention, optical units 3, 6 can also be controlled alternatively or in addition to light sources 2, 4 in order to generate the different light distributions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An illumination device for vehicles, the illumination device comprising:
    a first light module having a light source and an optical unit to generate a first illumination region;
    a second light module having a light source and an optical unit to generate a second illumination region; and
    a control unit to control the first light module and the second light module so that a larger number of light pixels are imaged in the first illumination region than in the second illumination region with respect to a surface of equal size,
    wherein the light pixels of the first light module have a greater illumination intensity than the light pixels of the second light module,
    wherein the control unit acts upon the light source of each of the first light module and the second light module such that when the light sources are activated, the light source of the first and second light module are each operated with a thermal light output within a tolerance band and below a maximum thermal light output,
    wherein the light source of the first light module and the light source of the second light module each have a plurality of light source elements, and
    wherein the light source of the first light module and the light source of the second light module have the same maximum light output.

2. The illumination device according to claim 1, wherein depending on a light distribution to be formed in the first illumination region and in the second illumination region, the light source elements of the light source of the first light module and the light source of the second light module are operated at different levels of thermal output, the difference of which is greater than the difference between an upper output value and a lower output value of the tolerance band.

3. The illumination device according to claim 2, wherein the upper output value of the tolerance band corresponds to either 65% or 55% of the maximum thermal output of the first light module or the second light module.

4. The illumination device according to claim 1, wherein the upper output value of the tolerance band corresponds to 70% of the maximum thermal output of the first light module or the second light module.

5. The illumination device according to claim 1, wherein the first illumination region comprises an area on a measuring screen that corresponds to a range from ⅕ to ⅔ of an area of the second illumination region on the measuring screen.

6. The illumination device according to claim 1, wherein the first illumination region is arranged superimposed on the second illumination region, such that the first illumination region is arranged entirely within the second illumination region.

7. The illumination device according to claim 1, wherein the first illumination region has a horizontal width of +/−14° and a vertical height of +/−7°.

8. The illumination device according to claim 1, wherein the light source elements of the light source of the first light module and the light source of the second light module are each arranged in a matrix-like manner such that a ratio of a horizontal width to a vertical height of the light source is in a range between 3 to 5.

9. The illumination device according to claim 1, wherein the light source of the first light module and the light source of the second light module each have at least 10,000 of the light source elements.

10. The illumination device according to claim 1, wherein the control unit has an imaging error compensation control via which the light source elements of the light source of the second light module are switched on and the light of which is emitted by the optical unit of the second light module onto a region imaged insufficiently by the optical unit of the first light module in the first illumination region in order to compensate for imaging errors of the first light module.

11. The illumination device according to claim 1, wherein the control unit has a fine resolution control via which, in a fine resolution region, only the light source elements of the first light module and not of the second light module are activated in order to project a finely resolved structure in an area in front of the vehicle.

12. The illumination device according to claim 1, wherein the optical unit of the first light module and the optical unit of the second light module are each formed by a lens arrangement that images the light emitted by the light source of the first light module in the first illumination region and the light emitted by the light source of the second light module in the second illumination region.

13. The illumination device according to claim 1, wherein the control unit is provided exclusively for controlling the light source of the first light module or the light source of the second light module, wherein the light source elements of the light source of the first light module or the light source of the second light module are controlled such that a low beam distribution or a high beam distribution is generated with or without an integrated fine resolution light distribution.

14. The illumination device according to claim 1, wherein the control unit has a short-term control via which, in a predefined time window that is dependent on a maximum cooling capacity and on cooling modules associated with each of the light sources, the light source elements of the first light module are operated at a maximum thermal light output and the light source elements of the second light module are operated at a differential output to form a required light output at the respective light pixels of the light distribution.

15. The illumination device according to claim 1, wherein the light sources of the first light module and of the second light module each have the plurality of light source elements which, when activated, are operated at a maximum thermal light output or at a partial output and are controlled by the control unit such that a sum of the light output generated by the light source elements of the respective light modules runs within the tolerance band.

16. The illumination device according to claim 1, wherein the light sources of the first and second light module are arranged on a same support.

17. The illumination device according to claim 1, wherein the light sources of the first and second light modules are each assigned a respective cooling module.

18. An illumination device for vehicles, the illumination device comprising:
   a first light module having a light source and an optical unit to generate a first illumination region;
   a second light module having a light source and an optical unit to generate a second illumination region; and
   a control unit to control the first light module and the second light module so that a larger number of light pixels are imaged in the first illumination region than in the second illumination region with respect to a surface of equal size,
   wherein the light pixels of the first light module have a greater illumination intensity than the light pixels of the second light module,
   wherein the control unit acts upon the light source of each of the first light module and the second light module such that when the light sources are activated, the light source of the first and second light module are each operated with a thermal light output within a tolerance band and below a maximum thermal light output, and
   wherein the maximum thermal light output of each respective light source corresponds to a sum of the maximum thermal light output of individual light source elements of the same light source.

* * * * *